United States Patent [19]

Wessling et al.

[11] Patent Number: 4,859,339
[45] Date of Patent: Aug. 22, 1989

[54] MICROPOROUS MEMBRANES OF SYNDIOTACTIC VINYLAROMATIC POLYMERS

[75] Inventors: Ritchie A. Wessling; Chieh-Chun Chau; Alan F. Burmester, all of Midland, Mich.

[73] Assignee: The Dow Chemical Company, Midland, Mich.

[21] Appl. No.: 154,777

[22] Filed: Feb. 11, 1988

[51] Int. Cl.[4] .......................... B01D 13/00; C08J 9/28; B29D 55/12
[52] U.S. Cl. .................................. 210/500.34; 55/16; 264/41; 264/234; 264/288.8; 264/290.2
[58] Field of Search ............... 264/41, 49, 234, 288.8, 264/290.2; 210/500, 34; 55/16

[56] References Cited

U.S. PATENT DOCUMENTS

| | | | |
|---|---|---|---|
| 3,567,810 | 7/1971 | Baker | 264/41 |
| 3,896,061 | 7/1975 | Tanzawa et al. | 264/49 X |
| 4,115,492 | 6/1978 | Mahoney et al. | 264/49 |
| 4,539,256 | 9/1985 | Shipman | 264/41 X |
| 4,680,353 | 9/1987 | Ishihara et al. | 526/160 |

*Primary Examiner*—Philip Anderson
*Attorney, Agent, or Firm*—Douglas N. Deline

[57] ABSTRACT

Microporous, asymmetric membranes comprising syndiotactic vinylaromatic polymers having utility as membranes for ultrafiltration or reverse osmosis and a process for their production.

12 Claims, No Drawings

MICROPOROUS MEMBRANES OF SYNDIOTACTIC VINYLAROMATIC POLYMERS

BACKGROUND OF THE INVENTION

The present invention relates to an anisotropic membrane having improved heat resistance and hydrolytic stability. More particularly the present invention relates to such an anisotropic membrane which is usefully employed in separation processes such as ultrafiltration and reverse osmosis. In U.S. Pat. No. 3,567,810 anisotropic membranes (also referred to as asymmetric membranes) are prepared by forming a polymer solution into a membrane and contacting the membrane with a liquid diluent for the solvent which is of a sufficiently low degree of compatibility with the polymer to effect precipitation of the polymer thereby creating an anisotropic structure therein. For the teaching contained therein, U.S. Pat. No. 3,567,810 is hereby incorporated in its entirety by reference thereto.

Polystyrene exists in three distinct molecular forms: isotactic; syndiotactic and atactic. Although having desirable chemical properties, atactic polystyrene has generally failed to result in a suitable asymmetric membrane due to its solvent sensitivity and poor thermal properties. Isotactic polystyrene is known to possess improved resistance to temperatures and better solvent resistance compared to atactic polystyrene. However, the material is relatively slow to form a crystal structure, a necessary step in preparing a membrane. Thus, isotactic polystyrene also cannot be employed to prepare membranes. Syndiotactic polystyrene possesses many of the beneficial attributes of isotactic polystyrene, however, techniques for forming asymmetric membranes of crystalline syndiotactic polystyrene have been previously unknown. The fundamental cause of this failure is that solvents capable of dissolving the polymers at an elevated temperature and also preventing crystallization from taking place rapidly at a reduced temperature have been previously unknown. Crystal formation at ambient conditions such as are desirably utilized to form membranes results in an intractable gel or paste lacking sufficient fluidity for membrane formation.

Syndiotactic vinylaromatic polymers and a process for their preparation have been disclosed in U.S. Pat. No. 4,680,353, the teachings of which are incorporated herein by reference thereto. In the reference a polymerization catalyst is disclosed which is suitably employed in the preparation of vinylaromatic polymers having a syndiotactic configuration. By the term syndiotactic as used herein is meant that the degree of syndiotacticity at a racemic diad in the nuclear magnetic residence (NMR) spectrum is higher for such polymers than for polymers of identical monomers obtained by conventional free radical polymerization techniques. A preferred syndiotactic vinylaromatic polymer is syndiotactic polystyrene having a methyl ethyl keytone insoluable polymer content of at least about 75 weight percent.

Syndiotactic vinylaromatic polymers have significantly enhanced resistance to the effects of heat. That is, the polymers possess elevated melting temperatures. For example, the crystalline melting point of syndiotactic polystyrene is approximately 270° C.

Syndiotactic polyvinylaromatic polymers also possess superior mechanical and chemical properties, such as solvent resistance, compared to atactic polyvinylaromatic polymers. At normal room temperatures syndiotactic polyvinylaromatic polymers are extremely resistant to attack by common chemical solvents. Moreover the polymers possess good hydrolytic stability thus making them well suited for utilization in extreme chemical environments.

However, because of the chemical resistance of syndiotactic polyvinylaromatic polymers, and the other previously mentioned disadvantages, methods for the preparation of membranes therefrom have been wanting. It would be desirable if there were provided a practical method for forming anisotropic membranes of crystalline syndiotactic vinylaromatic polymers.

SUMMARY OF THE INVENTION

According to the present invention there is now provided a process for preparing an asymmetric, microporous membrane of a syndiotactic vinylaromatic polymer comprising:
(a) forming a solution comprising the syndiotactic vinylaromatic polymer and a polar aprotic solvent at an elevated temperature;
(b) supercooling the solution so as to retain the syndiotactic vinylaromatic polymer in solution;
(c) forming the solution into a membrane;
(d) including phase separation and pore formation so as to result in the preparation of a asymmetric microporous membrane.

In a further embodiment of the present invention there is provided an asymmetric, microporous membrane of a syndiotactic vinylaromatic polymer.

DETAILED DESCRIPTION OF THE INVENTION

By the term "vinylaromatic polymer" as used herein are meant homopolymers or copolymers of vinylaromatic monomers such as styrene; alkyl styrenes (paramethylvinyltoluene, tertiary butylstyrene, etc.); halo-styrenes (chlorostyrene, 1,4-dichlorostyrene, bromostyrene, etc.); alkylhalostyrenes (1-chloro-4-vinyltoluene, etc.); and similar inertly substituted vinylaromatic compounds. Also included are copolymers of a vinylaromatic monomer and one or more copolymerizable comonomers.

Suitable polar, aprotic solvents for use in the present invention are compositions haaving a boiling point of at least 175° C. and preferably at least 200° C., and a solubility parameter of at least 10. Preferred polar, aprotic solvents are those wherein the syndiotactic polyvinylaromatic polymer is soluble to at least 5 weight percent therein, water miscible and wherein the vinylaromatic polymer solution can be supercooled such that it retains fluidity at temperatures less than 35° C. such that a membrane may be prepared therefrom. Most preferred are such solvents wherein the solution viscosity of the supercooled solution at such temperature is from about 1 to about 20 poise. Particularly suitable polar, aprotic solvents are selected from the group consisting of $C_{1-10}$ alkyl, cycloalkyl, aryl or alkaryl nitrogen substituted pyrrolidone compounds, mixtures thereof, or a mixture of such compounds with other polar aprotic solvents. Most highly preferred solvents are N-cyclohexyl-2-pyrrolidone, and N-methyl-2-pyrrolidone.

Inert diluents, co-solvents, nonsolvents and pore forming additives may be included in the formulation provided they do not interfere with the supercooling step.

The syndiotactic vinylaromatic polymer and solvent are combined and heated until dissolution is complete. Suitably, temperatures of from about 150° C. to 300° C. may be employed. Elevated pressures may be employed if desired but are preferably avoided to simplify processing conditions. When the polar aprotic solvents are solids at ambient conditions, the mixture must be heated to elevated temperatures in order to form the desired liquid state.

After preparation of a solution of the syndiotactic vinylaromatic polymer in the polar, aprotic solvent, a membrane is cast utilizing techniques previously known in the art, for example those techniques disclosed in 3,567,810. In a desirable embodiment the solution is supercooled preferably to a temperature less than about 35° C. prior to casting the membrane. The membrane casting process may employ any of the known membrane process equipment. Such equipment includes conventional flat sheet membrane processing equipment as well as tubular filamentary type of spinning equipment.

Phase separation and porosity may be introduced into the membrane by any suitable technique. In a preferred embodiment, phase separation (coagulation) and suitable porosity are introduced by contacting the membrane with a substance that is miscible with the polar, aprotic solvent but is a non-solvent for the syndiotactic vinylaromatic polymer. The membrane and substance are contacted for a time that is sufficient to leach the polar aprotic solvent and form the desired porous structure. Preferred substances are liquids at ambient conditions. A most preferred liquid for the coagulation and leaching process is water. Asymmetry is introduced into the membrane by the coagulation and leaching process where only one major surface is contacted with the leaching substance. Suitably the membrane may be cast onto a solid, non-porous substrate and the exposed surface contacted with the liquid. Alternatively, a second coating material may be applied to one surface of the membrane to introduce the desired asymmetry. Optionally, the solvent may be partially evaporated from the solution surface during the fabrication process to obtain a dense skin layer on the membrane surface, and increase asymmetry.

Crystal formation in the polymer may be induced before, after or simultaneous with the formation of the microporous structure. In a preferred embodiment, crystal formation is rapidly induced by use of an annealing process whereby the membrane is heated to a temperature above the glass transition temperature of the vinylaromatic polymer and allowed to remain at the temperature for a time sufficient to cause crystal formation therein. For example, utilizing syndiotactic polystyrene it is suitable to anneal the polymer membrane by heating to a temperature of about 90° C. to 120° C. for a time from about 10 minutes to about 1 hour and thereafter cooling the resulting crystallized membrane. The above technique for crystal formation may also be performed prior to phase separation if desired. Crystal formation by any suitable technique is desired in order to achieve the beneficial result of improved tensile properties. If desired crystal formation may be substantially avoided by retaining the resulting membranes at reduced temperatures.

According to a further embodiment of the present invention the vinylaromatic polymer may be oriented. Such orientation may be accomplished by the technique of inducing a strain into the polymer at the time of crystal formation. Such strain may be induced by uniaxially or biaxially stretching the polymer at a temperature above its glass transition temperature. Accordingly if the membrane is stretched by physically pulling on a flat membrane or expanding the diameter of a fiber by use of a compressed gas or other suitable technique while at an orientable temperature, such as during the annealing process, it is possible to induce crystal formation in a regular or ordered manner. Orientation should preferably be performed in a rapid manner on polymer membranes that have been rapidly cooled so as to avoid substantial crystal formation under quiescent conditions.

The membrane having an oriented structure obtainable by the aforementioned process generally possesses improved tensile properties due to the polymers molecular orientation. Thus the resulting oriented membrane may possess improved longevity under actual use conditions.

Having described the invention the following examples are provided as further illustrative and are not to be construed as limiting.

EXAMPLE 1

Syndiotactic polystyrene (0.5 g, Mw 349,000) prepared according to the technique of U.S. Pat. No. 4,680,353 but utilizing cyclopentadienyl titanium triphenoxide catalyst and 5 cc of 1-methyl-2-pyrrolidone (NMP) (Fisher Scientific) were mixed together in a glass bottle. The bottle was heated on a hot plate at a temperature of 200° C. to form a homogeneous liquid solution. The solution was cooled to room temperature and was seen to be clear and fluid. The solution was cast on a Sanko membrane substrate and shaped into a flat sheet membrane form by using a 15 mil cast bar. The substrate with the cast solution was immediately immersed in water at 20° C. for 15 min to coagulate the material to form a microporous membrane. The membrane was subsequently dried in air for about 6 hours. The membrane was white and opaque.

Improved physical properties (tensile strength) were obtained upon annealing by heating to 100° C. for 30 minutes and cooling to room temperature by exposure to air under ambient conditions.

The transport properties of the membrane were evaluated by using an Amicon model 8010 10 cc stirred cell. The membrane was found to give a water transmission rate about 45 GFD at 7 psig and a particle size retention of 0.913 um.

EXAMPLE 2

The process conditions of Example 1 were substantially repeated excepting that the solvent was N-cyclohexyl-2-pyrrolidone. The resulting membrane was annealed by heating to 100° C. and cooling. Transport properties were found to be approximately equal to the membrane of Example 1.

What is claimed is:

1. A microporous, asymmetric membrane comprising a syndiotactic vinylaromatic polymer.

2. A crystalline, microporous, asymmetric membrane comprising a syndiotactic vinylaromatic polymer.

3. An oriented crystalline, microporous, asymmetric membrane comprising a syndiotactic vinylaromatic polymer.

4. A process for preparing an asymmetric, microporous membrane comprising a syndiotactic vinylaromatic polymer comprising:
   (a) forming a solution comprising a syndiotactic vinylaromatic polymer and a polar aprotic solvent at a elevated temperature;
   (b) supercooling the solution so as to retain the syndiotactic vinylaromatic polymer in solution;
   (c) forming the solution into a membrane;
   (d) inducing phase separation and pore formation by contacting the membrane with a substance that is miscible with the polar aprotic solvent but is a nonsolvent for the syndiotactic vinylaromatic polymer so as to result in the formation of an asymmetric, microporous membrane.

5. A process according to claim 4 wherein the polar, aprotic solvent is a $C_{1-4}$ alkyl, cycloalkyl, aryl or alkaryl N-substituted pyrrolidone.

6. A process according to claim 4 wherein the polar, aprotic solvent is selected from the group consisting of N-cyclohexyl-2-pyrrolidone and N-methyl-2-pyrrolidone.

7. A process according to claim 4 wherein the membrane is leached with the contacting substance.

8. A process according to claim 7 wherein the contacting substance is water.

9. A process according to claim 4 wherein crystal formation is induced in the membrane by heating the membrane to a temperature above the glass transition temperature of the syndiotactic vinylaromatic polymer.

10. A process according to claim 9 wherein the syndiotactic vinylaromatic polymer has an oriented molecular structure.

11. A process according to claim 10 wherein the polymer is oriented by uniaxial or biaxial stretching the membrane while at an orientable temperature.

12. A process according to claim 4 wherein the syndiotactic vinylaromatic polymer is syndiotactic polystyrene.

* * * * *